United States Patent
Lichtman et al.

(10) Patent No.: US 7,072,584 B1
(45) Date of Patent: Jul. 4, 2006

(54) NETWORK HUB EMPLOYING 1:N OPTICAL PROTECTION

(75) Inventors: Eyal Lichtman, Ramat Gan (IL); Lior Shabtay, Ganai Tikva (IL)

(73) Assignee: Atrica Israel Ltd., Herzelia (IL)

( * ) Notice: Subject to any disclaimer, the term of this patent is extended or adjusted under 35 U.S.C. 154(b) by 602 days.

(21) Appl. No.: 10/126,983

(22) Filed: Apr. 22, 2002

(51) Int. Cl.
- *H04B 10/20* (2006.01)
- *H04J 14/00* (2006.01)
- *H04J 14/02* (2006.01)
- *G02F 1/00* (2006.01)
- *H01S 3/00* (2006.01)

(52) U.S. Cl. .................. 398/59; 398/79; 398/83; 398/3; 398/7

(58) Field of Classification Search .......... 398/1–5, 398/7, 45, 48, 50, 55, 56, 59, 79, 82, 83, 398/90, 91
See application file for complete search history.

(56) References Cited

U.S. PATENT DOCUMENTS

| | | | |
|---|---|---|---|
| 5,216,666 A | 6/1993 | Stalick | |
| 5,299,293 A | 3/1994 | Mestdagh et al. | |
| 5,663,949 A | 9/1997 | Ishibashi | |
| 5,777,761 A * | 7/1998 | Fee | 398/7 |
| 6,046,832 A | 4/2000 | Fishman | |
| 6,512,611 B1 | 1/2003 | Phelps et al. | |
| 6,744,760 B1 * | 6/2004 | Solheim | 370/366 |
| 2002/0145779 A1 * | 10/2002 | Strasser et al. | 359/124 |
| 2004/0131366 A1 * | 7/2004 | Tsushima et al. | 398/197 |

* cited by examiner

*Primary Examiner*—M. R. Sedighian
*Assistant Examiner*—Nathan Curs
(74) *Attorney, Agent, or Firm*—Zaretsky & Associates PC; Howard Zaretsky

(57) ABSTRACT

A 1:N protection scheme that provides both equipment and line protection against a single point of failure for a network hub situated in an optical ring network. The invention is suitable for use in DWDM based optical ring networks, and in particular, in networks constructed having a logical star over physical ring topology. The hub is modified to comprise N+1 transceivers, assuming an N channel DWDM network wherein each of the N transmitters operates using a different wavelength. Protection against line failures is achieved by optically splitting the transmit signal into two paths and transmitting each separately in opposite directions over the ring (i.e. 1+1 protection). In the event of a line failure, the other signal should still arrive at the destination. Protection against equipment failures is achieved through the use of a spare transceiver having a tunable wavelength of operation (i.e. 1:N protection).

30 Claims, 7 Drawing Sheets

NETWORK HUB EMPLOYING 1:N OPTICAL PROTECTION

FIELD OF THE INVENTION

The present invention relates generally to optical networks and more particularly relates to an optical network hub incorporating 1:N optical protection against both communication line and equipment failures.

BACKGROUND OF THE INVENTION

Optical communication systems are becoming more and more widespread due mainly to the very large bandwidths they offer for carrying information. The growth and diversity of lightwave networks, such as Wavelength Division Multiplexed (WDM) and Dense WDM (DWDM) networks are placing new demands on all aspects of optical networks including, for example, capacity management and provisioning, maintenance, and reliable and robust operation.

Currently, high capacity optical networks are constructed as rings and use WDM technology to achieve high bandwidth capacities. For example, WDM ring networks are commonly used in metropolitan area network (MAN) applications but can also be used in LANs and WANs.

Wavelength division multiplexed (WDM) optical networks are particularly desirable because of their restoration capabilities and suitability for minimizing the number of optical fibers for the interconnection of system nodes. A typical WDM optical ring network includes network elements with optical add/drop multiplexers (OADMs), whereby some optical channels are dropped, some are added and/or other channels are expressed or passed through.

In a ring topology each ring node is connected to exactly two other ring nodes. The OADMs are used to construct a ring network whereby adjacent OADMs are connected pair wise while the network nodes are situated so as to form a ring. In a ring network, any node can be reached from any other node using two physically separate paths, i.e. one traveling clockwise and one counter clockwise. This is used for providing protection against route failures. The use of at least two parallel fibers with traffic flowing in opposite directions provides restoration capabilities in the event of a fiber cut break.

An Optical Add/Drop Multiplexer (OADM) functions to filter or drop one or more wavelengths transiting on the ring. The optical technologies usable for producing an OADM can be placed in two main categories, namely: (1) those using fixed filtering, whereby an OADM is produced for dropping and adding a fixed wavelength, and (2) those using tunable filtering, whereby an external control determines the wavelength of the dropped and added channel.

Normally, only a single wavelength of light is used to carry optical signals from one node to another. To increase the communications bandwidth of the network, however, it is common to transmit light signals having multiple wavelengths. Additional signal channels can be added using well-known DWDM techniques wherein each channel corresponds to a different wavelength of light.

As is common practice in DWDM optical networks, OADMs are used to drop, add or express one or more optical channels. The OADM comprises a drop module adapted to generate a drop channel from the multi-wavelength input signal and an add module adapted to add a channel to the multi-wavelength output signal.

A block diagram of a prior art network hub providing 1:1 protection against equipment and link failures is shown in FIG. 1. The optical network, generally referenced 10, illustrates a popular topology of a logical star over a physical ring. The network comprises a hub 12 and a plurality of access nodes 14 connected by optical fiber links 26 to form an optical ring network. Each access node comprises an Optical Add/Drop Multiplexer (OADM) 28 connected to a plurality of line cards or transceivers 30. The plurality of line cards 30 are connected to an electrical switch 29. Each channel or wavelength is terminated at a different access node, thus establishing a dedicated point to point connection between the hub and each of the access nodes. Communications between the hub and any one access node occurs using a different wavelength. Thus, at any one time, communications at a particular wavelength occurs between the hub and a single access node. In addition, it is possible for a wavelength to be shared by one or more access nodes on the ring.

In this example network, only a single ring is shown such that communications proceeds in the clockwise direction only. A second ring can be implemented that carries communications between nodes in the opposite or counter-clockwise direction.

The majority of protection schemes currently employed in communication systems are based either on 1:1 or 1+1 protection schemes. In order to provide protection against line failures, the same information is transmitted simultaneously in both directions around the ring. This requires doubling the equipment at every access node and at the hub. Doubling the equipment enables protection against equipment failure as well as protection against line failures by transmitting data in both directions of the ring. In this example, the hub comprises double equipment and, in particular, comprises two multiplexers 16, 24, two sets of line cards 18, 22 and a single switch 20. Note that in a dual hub system, four sets of line cards are required in order to achieve the same level of protection. Note also that under normal conditions, i.e. no line failure, both paths to an access node may be used to double the available bandwidth and thus improve efficiency. Further, a second switch may be used for redundancy purposes.

Although prior art 1:1 or 1+1 protection schemes provide line and equipment protection, a major disadvantage is that they are very expensive due to the requirement of doubling the equipment within the hub and access nodes.

There is thus a need for a protection scheme for a network hub that is not based on a 1:1 or 1+1 protection and that does not require the doubling of all the equipment within the hub. In addition, the protection scheme should protect against not only equipment failures within the network hub but also against communication link failures on the optical ring.

SUMMARY OF THE INVENTION

The present invention is a 1:N protection scheme that provides both equipment and line optical protection for a network hub. The invention is suitable for use in DWDM based optical ring networks, and in particular, in networks constructed having a logical star over physical ring topology. The optical protection scheme of the present invention is also applicable in rings employing dual network hubs for increased reliability.

Implementation of the protection scheme does not require any modification of the access nodes. Conventional access nodes may be used unchanged. The hub, however, is modified to comprise only N+1 transceivers, assuming an N channel DWDM network. Each of the N transmitters operates using a different wavelength, i.e. $\lambda_1$ to $\lambda_N$.

Protection against line failures is achieved by optically splitting the transmit signal into two paths and transmitting each separately in opposite directions over the ring (i.e. 1+1 protection). In the event of a line failure, the other signal should still arrive at the destination.

Protection against equipment failure is achieved through the use of a spare transceiver that is adapted to have a wavelength that is tunable for transmitting and receiving (i.e. 1:N protection). A transceiver having a tunable wavelength can be constructed using a transmitter having a tunable laser and a receiver having a tunable filter.

In the event of a failure of one of the fixed wavelength transceivers, the spare tunable transceiver replaces the failed transceiver. The tunable transceiver is configured to transmit and receive data at the wavelength of the failed fixed wavelength transceiver. The electronic switch fabric is configured to transmit and receive data traffic to and from the tunable transceiver rather than the failed fixed wavelength transceiver. The tunable transceiver is adapted to be configured to transmit and receive over any of the N wavelengths of the fixed wavelength transceivers thus being able to replace any fixed transceiver in the event of a failure.

In the receive direction, optical signals arrive at the hub from both directions of the ring. An optical switch is used to select one of the two received signals based on some suitable criteria such as BER, power levels, SNR, etc. The received signal is then forwarded in parallel to a demultiplexer and the tunable transceiver. If the receiver portion of the tunable transceiver is configured to the wavelength of the received signal, the signal is processed by the tunable transceiver and forwarded to the electronic switch fabric.

The 1:N protection scheme of the present invention thus eliminates the costly requirement of doubling the equipment at the hub while providing protection against line and equipment failures.

The elimination of double equipment in the hub presents a problem in that wavelength sharing on the ring network is not supported since different data signals having the same wavelength cannot arrive at the hub from different directions. Thus the deployment of dual hubs on a ring is problematic. The present invention overcomes this problem by providing a means of permitting the implementation of the protection scheme of the present invention in a ring network employing dual hubs. Dual hubs are desirable in order to provide equipment redundancy whereby one hub functions as the working hub and the second operates as the standby hub which takes over in the event of a failure of the working hub.

A dual hub ring network is supported by the addition of switches in the hub at the front end which either couple the two incoming communication links together or to the internal circuitry of the hub. One of the two hubs on the ring is either in a working mode or in a standby (or bypass) operation mode. The failure of the working hub causes the standby hub to become active and take over as the working hub.

A key advantage of the protection scheme of the present invention is that in addition to providing 1:N protection, the scheme provides protection against any single point of failure that may occur otherwise.

In terms of cost savings, the protection scheme of the present invention reduces the number of line cards and OEO cards required to support a single hub DWDM ring network wherein a single channel is dropped/added at each access node. The savings are significantly greater if any of the access nodes drops/adds several DWDM channels.

There is thus provided in accordance with the present invention a network hub for providing 1:N protection connected over a Dense Wave Division Multiplexing (DWDM) optical ring network to a plurality of access nodes comprising N transceivers, each transceiver adapted to transmit and receive over a different wavelength, wherein N is a positive integer, a tunable transceiver adapted to transmit and receive over a plurality of wavelengths, wherein in the event of a failure of one of the N transceivers, the tunable transceiver configured to transmit and receive using the wavelength of the failed transceiver, a mux/demux adapted to multiplex and demultiplex N signals output of the N transceivers to and from a multiplexed signal, means for combining the multiplexed signal and the output of the tunable transceiver and transmitting the combined signal in opposite directions over the optical ring and an optical switch adapted to select one of two signals received from opposite directions of the ring in accordance with a predetermined criteria, the selected signal input to the tunable transceiver and the mux/demux.

There is also provided in accordance with the present invention a network hub for providing 1:N protection connected over a Dense Wave Division Multiplexing (DWDM) optical ring network to a plurality of access nodes comprising N transceivers, each transceiver adapted to transmit and receive over a different wavelength, wherein N is a positive integer, a first multiplexer and a second multiplexer adapted to multiplex the N signals into a single multiplexed signal, N first couplers, each first coupler adapted to couple the signal output of one of the N transceivers to an input of the first multiplexer and the second multiplexer, a tunable transceiver adapted to transmit and receive over a plurality of wavelengths, wherein in the event of a failure of one of the N transceivers, the tunable transceiver configured to transmit and receive using the wavelength of the failed transceiver, a first coupler adapted to combine the output of the first multiplexer and the tunable transceiver and to transmit a first combined signal generated therefrom in a first direction over the optical ring, a second coupler adapted to combine the output of the second multiplexer and the tunable transceiver and to transmit a second combined signal generated therefrom in a second direction opposite to that of the first direction over the optical ring, a third coupler adapted to couple a signal received from the first direction of the optical ring to a first demultiplexer and to a first optical switch, a fourth coupler adapted to couple a signal received from the second direction of the optical ring to a second demultiplexer and to the first optical switch, the first demultiplexer and the second demultiplexer adapted to demultiplex an input signal into N signals each having a different wavelength, the first optical switch adapted to select one of two signals received from opposite directions of the optical ring in accordance with a predetermined criteria and to output the selected signal to the tunable transceiver and N second optical switches adapted to receive the N signals output of each of the first demultiplexers and the second demultiplexers, each second switch adapted to select one of two signals received from the opposite directions of the optical ring in accordance with a predetermined criteria and to output the selected signal to one or N transceivers associated therewith.

There is further provided in accordance with the present invention a network hub for providing 1:N protection connected over a Dense Wave Division Multiplexing (DWDM) optical ring network to a plurality or access nodes comprising N OEO modules, each transceiver adapted to transmit and receive over a different wavelength, wherein N is a positive integer and wherein each OEO module is in communication with a first network interface port of an ADM device, a tunable OEO module adapted to transmit and receive over a plurality of wavelengths, wherein in the event of a failure of one of the N transceivers, the tunable transceiver configured to transmit and receive using the wavelength of the failed transceiver, an N×1 optical switch adapted to transmit and receive and to be connected to the tunable OEO module and second network interface ports on N ADM devices, a mux/demux adapted to multiplex and demultiplex N signals output of the N OEO modules to and from a multiplexed signal, means for combining the multiplexed signal and the output of the tunable OEO module and transmitting the combined signal in opposite directions over the optical ring and an optical switch adapted to select one of two signals received from opposite directions of the ring in accordance with a predetermined criteria, the selected signal input to the tunable OEO module and the mux/demux.

There is also provided in accordance with the present invention a method of providing 1:N protection in a network hub connected to a dual hub based Dense Wave Division Multiplexing (DWDM) optical ring incorporating a plurality of access nodes, the method comprising the steps of providing N transceivers, each transceiver adapted to transmit and receive over a different wavelength, wherein N is a positive integer, providing a tunable transceiver adapted to transmit and receive over a plurality of wavelengths, wherein in the event of a failure of one of the N transceivers, the tunable transceiver configured to transmit and receive using the wavelength of the failed transceiver, splitting the signal output of each transceiver to generate N first output signals and N second output signals, multiplexing the N first output signals to generate a first multiplexed signal and the N second output signals to generate a second multiplexed signal, coupling the output of the tunable transceiver to generate a first tunable output signal and a second tunable output signal, combining the output of the first multiplexed signal and the first tunable output signal to generate a first combined signal therefrom, and the output of the second multiplexed signal and the second tunable output signal to generate a second combined signal therefrom, switching a first communication link and a second communication link, connected in opposite directions of the ring, either to the first combined signal and the second combined signal, respectively, or to each other depending on whether the network hub is in a working mode of operation or a standby mode of operation, selecting either a signal received from the first communication link or the second communication link for input to the tunable transceiver in accordance with a criteria, demultiplexing a signal received over the first communication link to generate N first demultiplexed signals and a signal received over the second communication link to generate N second demultiplexed signals and selecting either the N first demultiplexed signal or the N second demultiplexed signal for input to the N transceivers in accordance with a criteria.

There is still further provided in accordance with the present invention a network hub for providing 1:N protection connected in a dual hub based Dense Wave Division Multiplexing (DWDM) optical ring network incorporating a plurality of access nodes comprising N OEO modules, each transceiver adapted to transmit and receive over a different wavelength, wherein N is a positive integer and wherein each OEO module is in communication with a first network interface port of an add/drop multiplexer (ADM) device, a tunable OEO module adapted to transmit and receive over a plurality of wavelengths, wherein in the event of a failure of one of the N transceivers, the tunable transceiver configured to transmit and receive using the wavelength of the failed transceiver, an N×1 optical switch adapted to transmit and receive and to be connected to the tunable OEO module and second network interface ports on N ADM devices, a first coupler/switch for coupling, in a transmit direction, the signal output of each of N OEO modules to generate N first output signals and N second output signals, and for selecting, in a receive direction, either a first demultiplexed signal or a second demultiplexed signal in accordance with a criteria, a second coupler/switch for coupling, in a transmit direction, the signal output of the tunable OEO module to generate a first tunable output signal and a second tunable output signal, and for selecting, in a receive direction, either a signal received over a first communication link or a second communication link in accordance with a criteria, the second communication link connected in a direction over the ring opposite to that of the first communication link, a first mux/demux and a second mux/demux, the first mux/demux for multiplexing, in the transmit direction, the N first output signals to generate a first multiplexed signal therefrom, and in the receive direction, for demultiplexing a first received signal to generate N first demultiplexed signals therefrom, the second mux/demux for multiplexing, in the transmit direction, the N second output signals to generate a second multiplexed signal therefrom, and in the receive direction, for demultiplexing a second received signal to generate N second demultiplexed signals therefrom, a first coupler and a second coupler, in the transmit direction, the first coupler for combining the first multiplexed signal and the first tunable output signal to generate a first coupled signal thereby and the second coupler for combining the second multiplexed signal and the second tunable output signal to generate a second first coupled signal thereby, and in the receive direction, the first coupler for coupling a first received signal to the first mux/demux and to the second splitter/switch, and the second coupler for coupling a second received signal to the second mux/demux and to the second splitter/switch and a first switch and a second switch adapted to couple the first communication link and the second communication link, connected in opposite directions of the ring, either to the first coupler and the second coupler, respectively, or to each other depending on whether the network hub is in a working mode of operation or a standby mode of operation.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ADM | Add Drop Multiplexer |
| BER | Bit Error Rate |
| DWDM | Dense Wave Division Multiplexing |
| EDFA | Erbium Doped Fiber Amplifier |
| GE | Gigabit Ethernet |
| LAN | Local Area Network |
| LOS | Loss of Signal |
| MAN | Metropolitan Area Network |
| OADM | Optical Add Drop Multiplexer |
| OC | Optical Carrier |
| OEO | Optical-Electrical-Optical conversion |
| SNR | Signal to Noise Ratio |
| WAN | Wide Area Network |
| WDM | Wave Division Multiplexing |

Detailed Description of the Invention

The present invention is a 1:N protection scheme that provides both equipment and line optical protection for a network hub. The invention is suitable for use in DWDM based optical ring networks, and in particular, in networks constructed having a logical star over physical ring topology. The optical protection scheme of the present invention is also applicable in rings employing dual network hubs for increased reliability.

To aid in illustrating the principles of the present invention, the 1:N optical protection scheme is described in the context of a network hub device situated on a physical ring but connected to a plurality of access nodes in a logical star topology. The invention, however, is not limited to this application, as one skilled in the communication arts can apply the optical protection scheme of the present invention to other network topologies and configurations without departing from the spirit and scope of the present invention.

Throughout this document the term line card is defined as the portion of the network device, i.e. hub, access node, etc., responsible for transmitting and receiving over the physical medium (i.e. the optical fiber). Line cards may also be referred to as transceivers or transmitter/receivers. The term transceiver is defined as any device or combination of devices able to transmit and receive information. A transceiver may comprise separate transmitter, separate receiver or may comprise a line card. The term OADM or ADM is defined as any device capable of dropping and/or adding one or more DWDM channels.

Figure 1:
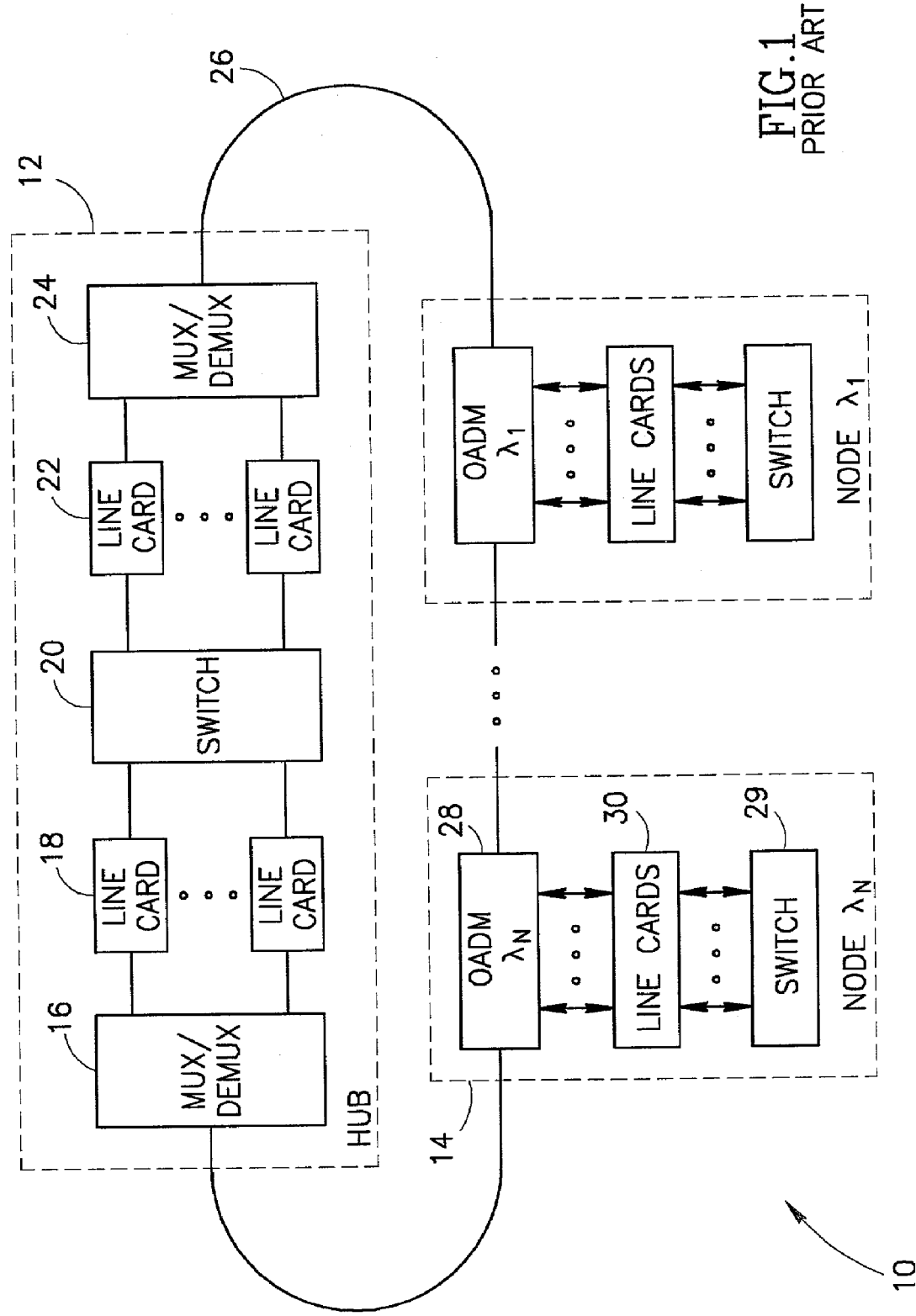
FIG. 1 is a block diagram of a prior art network hub providing 1:1 protection against equipment and link failures.
Figure 2:
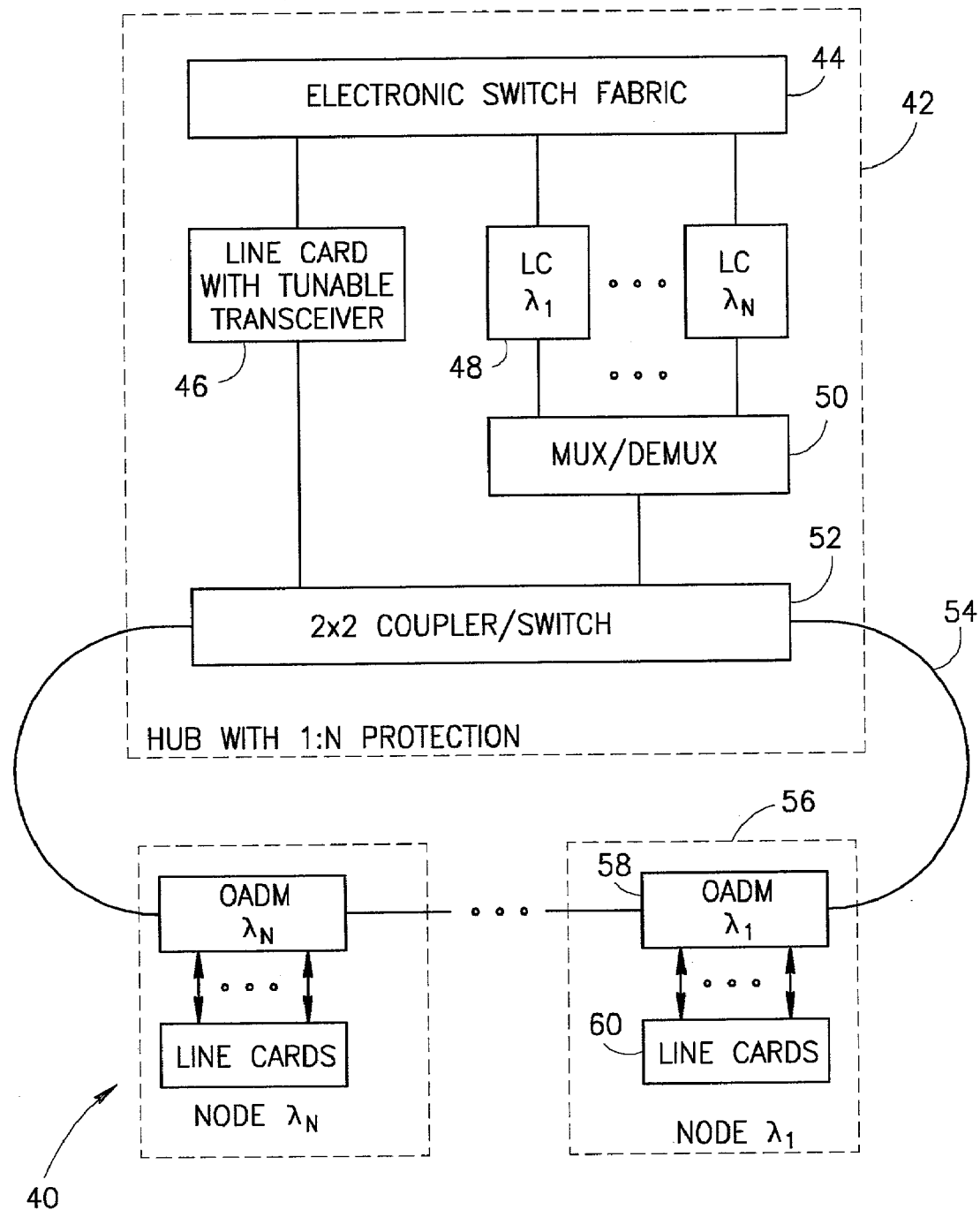
FIG. 2 is a block diagram of a network hub incorporating 1:N protection against both line and equipment failures constructed in accordance with the present invention.

A schematic block diagram of a network hub incorporating 1:N protection against both line and equipment failures constructed in accordance with the present invention is shown in FIG. 2. The network hub illustrates the general application of the protection scheme of the invention to an optical hub. A detailed implementation of an embodiment of the general scheme of FIG. 2 is presented in FIG. 3, described in more detail infra.

The network, generally referenced 40, comprises a network hub 42 and a plurality of access nodes 56. The hub comprises a switch 44, line card with tunable transceiver 46, N line cards with fixed wavelength transceivers 48, a multiplexer/demultiplexer 50 and a 2×2 coupler/switch 52. The access nodes comprise an OADM module 58 and one or more line cards 60.

The protection scheme illustrated is especially suited for optical ring networks logical star over physical ring network topology. Implementation of the protection scheme does not require any modification of the access nodes. Conventional access nodes may be used unchanged. The hub, however, is modified to comprise only N+1 transceivers/line cards, assuming an N channel DWDM network. Each of the N transmitters operates using a different wavelength, i.e. $\lambda_1$ to $\lambda_N$.

In the transmit direction, the N channels output of the line cards 48 are optically multiplexed together. In addition, an N+1$^{th}$ line card 46 provides protection for the N fixed wavelength line cards. This line card comprises a tunable transceiver whose wavelength for transmission and reception can be dynamically configured. At a minimum, the tunable transceiver can be configured to transmit and receive over any of the N wavelengths of the fixed line cards. Alternatively, the tunable transceiver can be adapted to communicate over additional wavelengths other than the wavelengths of the N fixed line cards. A tunable transceiver having a configurable wavelength may be constructed from a transmitter having a tunable laser and a receiver that incorporates a tunable filter. The output of the tunable transceiver and the multiplexed N channel data stream are optically coupled together, such as using a passive optical coupler, optically split and transmitted over both directions of the ring. Note that an optical amplifier may be used to boost the strength of the optical signal before being transmitted over the ring. For example, an amplifier of the commonly known Erbium Doped Fiber Amplifier (EDFA) type of amplifiers may be used.

In the receive direction, the receive signal is received from both directions of the ring. A 1×2 optical switch is employed to select one of the two input data streams to pass through to the receiver that are received from both directions of the ring. Since the hub comprises a single line card per wavelength, only one of the input data stream receive signals can be processed. The hub comprises means for generating the appropriate control signal for the switch. For example, the control for the optical switch may be provided by control means with the optical switch itself, the electronic switch fabric 44, separate management entity, control unit, etc.

The criteria for selecting one of the two receive signals may be based on any suitable metric such as the signal yielding the higher Bit Error Rate (BER), the received signal with the higher quality, the signal with the higher power level, etc. Sensors adapted to read the power level of the received signal may be placed on each of the links to the hub. The power readings are then used by the entity responsible for making the selection decision. In addition, the hub may comprise means to detect a Loss of Signal (LOS) condition on the links and in such an event, configure the optical switch to select the working link (i.e. the link not in LOS condition).

The output of the optical switch is then split and passed to both the tunable transceiver and the demultiplexers. The demultiplexer functions to separate the received signal into individual wavelengths which are subsequently input to the line cards according to the particular wavelength associated therewith.

Thus, protection against a line failure is achieved since the data stream is split and transmitted in opposite directions of the ring to the access nodes. Equipment protection is achieved by use of the tunable transceiver/line card which serves as a standby transceiver in the event of a failure of any of the fixed wavelength transceivers/line cards in the hub. Alternatively, the tunable transceiver may be utilized to increase the capacity of the hub in the absence of a failure. Once a failure is detected, however, it is configured to replace the failed line card.

Note that alternatively, the splitter may be placed before the multiplexer, i.e. between the line cards and the multiplexer, to protect against the single point of failure of the splitter that exists otherwise. This is illustrated in the embodiments presented infra.

It is important to note that only splitting the signal for transmission over both directions of the ring provides protection against a line failure but does not provide protection against equipment failures. It is the combination of the means for splitting the transmit signal over opposite directions of the ring in combination with the tunable transceiver that provides optical protection against both line and equipment failures.

Hub with 1:N Optical Protection Using Tunable Transceiver

Figure 3:
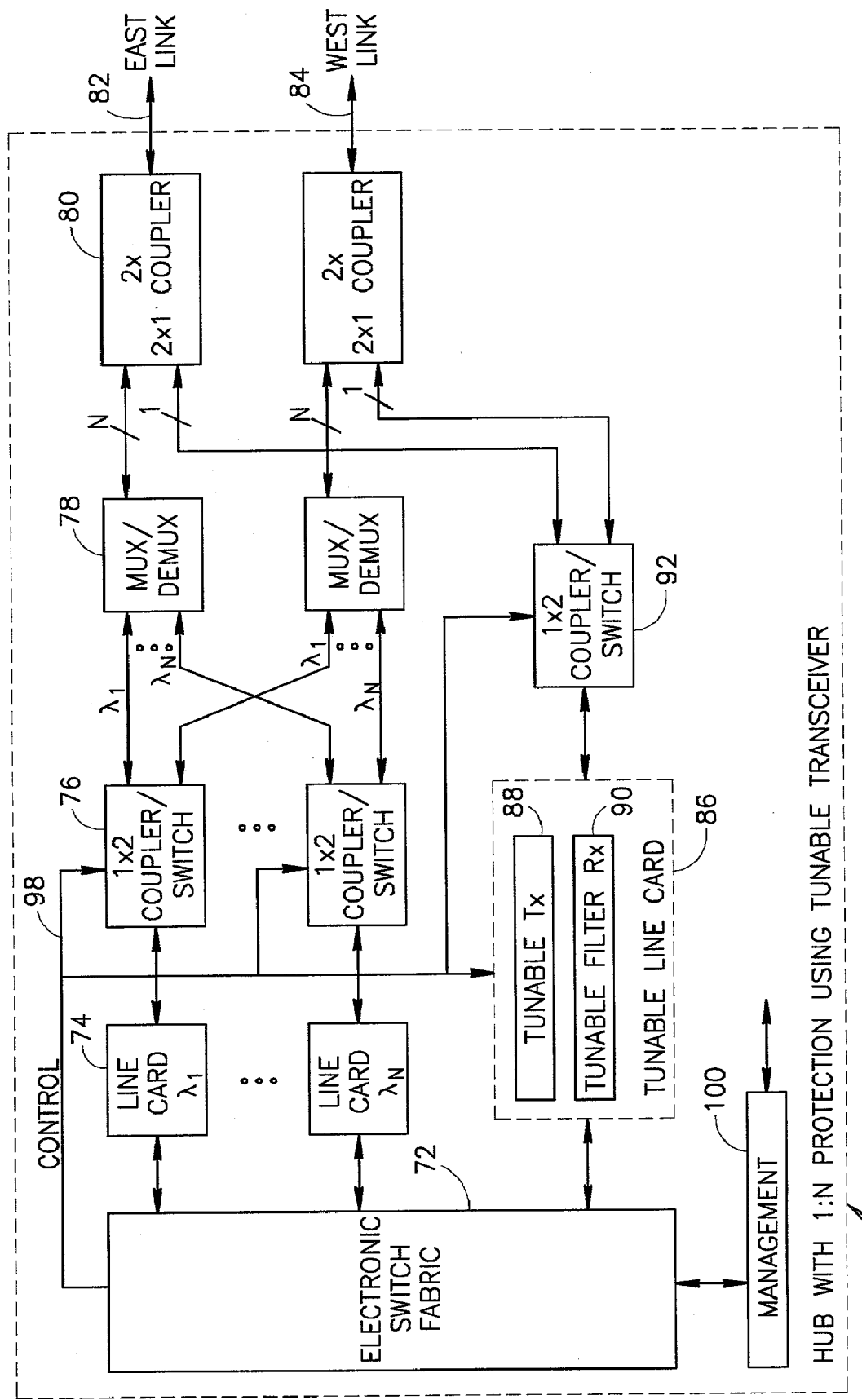
FIG. 3 is a block diagram of a network hub incorporating 1:N protection against both line and equipment failures employing tunable transceivers constructed in accordance with the present invention.

A block diagram of a network hub incorporating 1:N protection against both line and equipment failures employing tunable transceivers constructed in accordance with the present invention is shown in FIG. 3. The network hub shown is a closed system illustrating a detailed embodiment of the general application of the protection scheme shown in FIG. 2. The hub, generally referenced 70, is adapted to be connected in an optical ring network to communication links traveling in opposite directions, herein labeled East link 82 and West link 84. In addition, the hub provides protection against any single point of failure.

In accordance with the invention, the hub provides a 1:N optical protection scheme for a logical star over physical ring network topology. The access nodes remain substantially unchanged relative to off the shelf conventional access nodes while the hub is modified to provide protection against both line and equipment failures. In addition, the hub 70 comprises means for avoiding the single point of failure problem that would arise otherwise.

In particular, the hub comprises an electrical switch fabric 72 connected to N line cards 74 (assuming N number of DWDM channels) configured to wavelength $\lambda_1 \ldots \lambda_N$, N 1×2 coupler/switch modules 76, dual multiplexer/demultiplexers 78, dual 2×(2×1) couplers 80, a tunable line card 86 and associated 1×2 coupler/switch 92. In addition, a management module 100 provides administration, operation, control and management functions in the hub.

In the transmit direction, the hub operates as follows. Data traffic output of the switch is steered to the appropriate line card, wherein each line card is adapted to generate an optical signal having a different fixed wavelength. Note that the line card may be adapted to transmit and receive data at any rate using any desired format or protocol, e.g., 1 Gigabit Ethernet (GE), 10 GE, etc. with the limitation that all N+1 line cards communicate at the same rate. The N optical data streams are then optically split and sent along two paths. The N signals in each path are multiplexed via two multiplexers 78 and output to dual 2×(2×1) couplers 80. Each coupler 80 comprises two 2×1 optical couplers, one for the transmit direction and one for the receive direction.

The tunable transceiver receives a data stream from the electronic switch fabric and generates an optical signal having a variable wavelength. The output is input to the 1×2 coupler 92 whose output is input to the 2×(2×1) couplers 80. The 2×(2×1) couplers 80 function to combine the multiplexed signal with the output of the tunable transceiver and transmit the combined signal in opposite directions of the ring. One 2×(2×1) coupler is connected to the East link and the other 2×(2×1) coupler is connected to the West link. The tunable transceiver comprises a transmitter 88 having a tunable laser.

In the receive direction, the signals received from the East and West directions are each split via 2×(2×1) couplers 80 and input to the dual demultiplexers 78 and the switch 92. The two receive signals are demultiplexed and each wavelength is input to an optical switch 76 associated with a particular wavelength. The switch selects one or the other received signal and forwards it to the line card associated therewith. The criteria for selecting one of the two receive signals may be based on any suitable metric such as the signal yielding the higher Bit Error Rate (BER), the received signal with the higher quality, the signal with the higher power level, etc. Sensors adapted to read the power level of the received signal may be placed on each of the links to the hub. The power readings are then used by the entity responsible for making the selection decision (e.g., the management module). In addition, the hub may comprise means to detect a Loss of Signal (LOS) condition on the links and in such an event, configure the optical switch to select the working link (i.e. the link not in LOS condition).

The split signals received from opposite directions of the ring are also input to an optical switch 92. The switch 92 makes the same selection as the N switches 76 depending on the chosen criteria. The signal is input to the receiver incorporating a tunable filter 90.

The control signals 98 provided by the electronic switch fabric 72 function to configure the optical switches and the tunable transceiver. In particular, the control signals determine the optical switch selection and enable and configure the wavelength of the tunable transceiver. Alternatively, the control signals may be provided by other entities in the hub such as the management module 100, by the optical switches themselves, external control unit, etc.

In the event of a failure of one of the links, the LOS condition is detected by means within the hub and the optical switches 76, 92 are configured to receive the signal from the non-failed link. In the event of a failure of either a line card or 1×2 coupler/switch, the tunable transceiver is configured to transmit and receive the wavelength of the failed channel. In addition, the electrical switch fabric 72 is configured to send and receive data traffic to and from the tunable transceiver rather than the failed line card.

In an alternative embodiment, the optical switches may be placed before the mux/demuxs, i.e. between the mux/demuxs and the 2×(2×1) couplers, such that the signal output of each 2×(2×1) coupler is input to the mux/demux. Although in this embodiment only a single optical switch and a single mux/demux is required, the use of the single switch and mux/demux lowers the reliability of the hub.

Hub with 1:N Optical Protection Using Tunable OEO Module

The protection scheme of FIG. 3, implements the 1:N optical protection scheme for line cards as a closed system. In such a system, in the event of a line card failure, the electronic switch fabric is configured to direct the affected data to the standby tunable transceiver. The optical protection scheme of the present invention can also be applied to an open system that employs Optical/Electrical/Optical (OEO) conversion modules. In this case, the data traffic does not pass through the electronic switch fabric and a different configuration is used.

An OEO is an electrical based repeater used to regenerate the signal in the electrical domain. The OEO modules function to convert the signal from optical to electrical and back to optical. In operation, the optical signal received by the OEO is converted from the optical domain to the electrical domain by an optical to electrical converter to yield an electrical signal. The electrical signal is then amplified and regenerated to yield a regenerated electrical signal. This signal is then converted to an optical signal by electrical to optical converter at a particular wavelength that is usually fixed. Benefits of electrical regeneration of the signal include wavelength conversion and the removal of noise from the ring. In addition, each channel is accessible electrically for other possible purposes.

Figure 4:
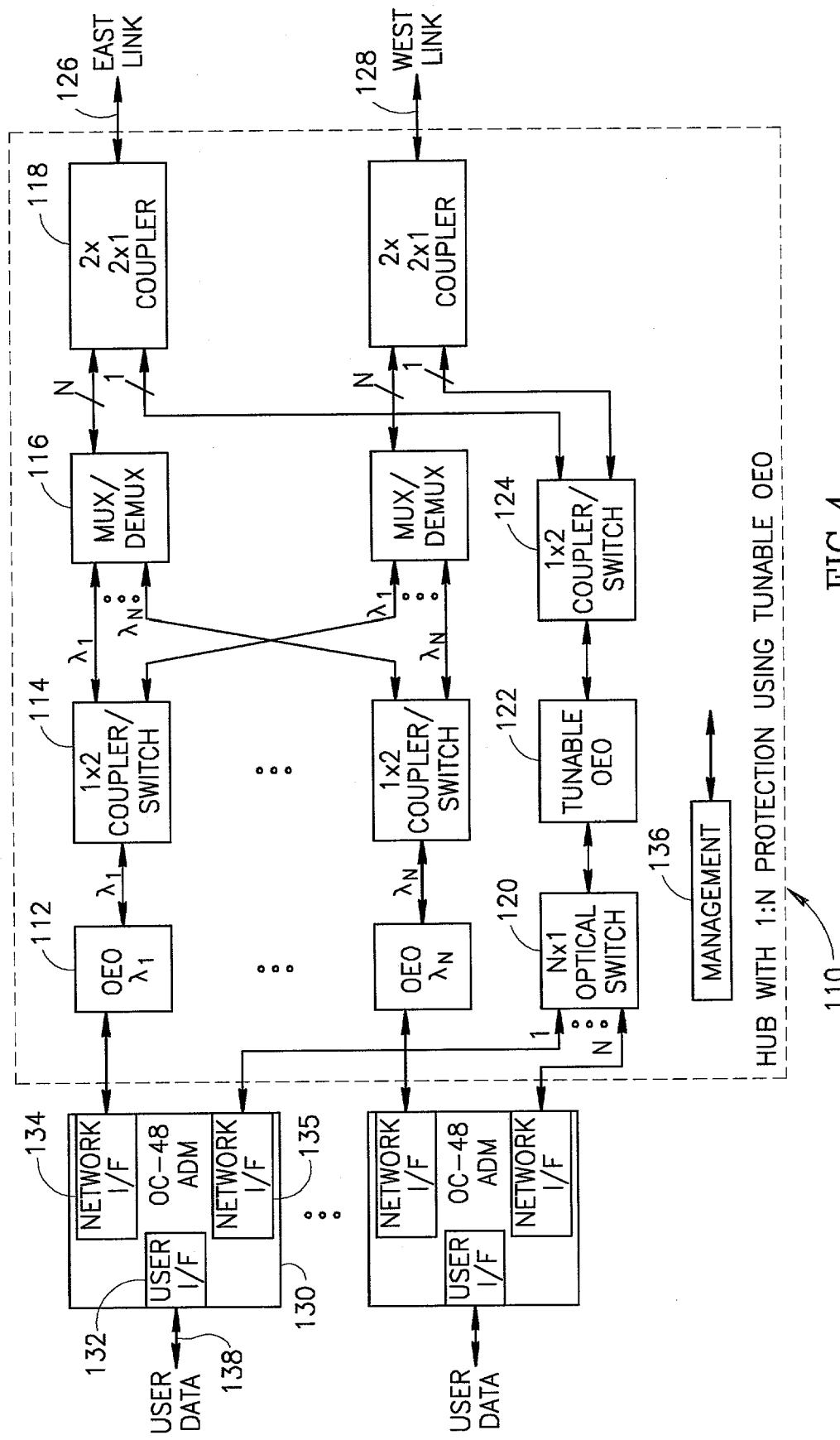
FIG. 4 is a block diagram of a network hub incorporating 1:N protection against both line and equipment failures employing tunable OEO modules constructed in accordance with the present invention.

A block diagram of a network hub incorporating 1:N protection against both line and equipment failures employing tunable OEO modules constructed in accordance with the present invention is shown in FIG. 4. This configuration employs external add/drop multiplexers (ADMs) having any desired data rate, e.g., OC-48, OC-192, etc. Each external ADM supports at least two data streams for protection purposes. Note that the present invention also contemplates a hub configuration for providing 1:N protection that employs both line cards and OEO modules.

In accordance with the invention, the OEOs used preferably are (1) identical in the case that the ADMs are identical having the same data rate; (2) bit rate transparent wherein the ADMs are configured to different data rates; or (3) reconfigureable via software in conjunction with the use of tunable transceivers.

In particular, the hub, generally referenced 110, comprises N OEO modules 112 (assuming N number of DWDM channels), N 1×2 coupler/switch modules 114, dual multiplexer/demultiplexers 116, dual 2×(2×1) couplers 118, an N×1 optical switch 120, tunable OEO module 122 and associated 1×2 coupler/switch 124. In addition, a management module 136 provides administration, operation, control and management functions in the hub. The tunable OEO module comprises a tunable transmitter and receiver at the network side.

The operation of the hub 110 is similar to that of the hub 70 of FIG. 3 with the difference being the use of OEO modules in communication with the external ADMs rather than line cards and the absence of an electrical switch fabric. Each OEO module is configured to convert the signal received from the external ADM to a different fixed wavelength. The multiplexed signals are coupled with the signal from the tunable OEO module and the coupled signal sent in opposite directions over the ring, e.g., East link 126 and West link 128.

The external ADMs 130 comprise a user interface 132 and at least two network interfaces 134, 135. The user interface is connected to a source of user data 138. One network interface of each ADM is connected to one of N OEO modules 112. The second network interface of each ADM is connected to an N×1 optical switch 120 which is configured to couple one of the N inputs to the tunable OEO module 122 in the event of a failure. The optical switch 120 functions to steer the spare OEO module to a particular ADM via the second network interface in the ADM. The output of the tunable OEO module is subsequently split for transmission over both directions of the ring.

In the event of a failure of one of the fixed OEO modules 112, the management module 136 is adapted to control the N×1 optical switch 120 and configure the tunable OEO 122 to transmit and receive over the wavelength of the failed OEO module.

In terms of cost savings, the protection scheme of the present invention reduces the number of line cards and OEO cards required to support a single hub DWDM ring network wherein a single channel is dropped/added at each access node. The savings are significantly greater if any of the access nodes drops/adds several DWDM channels. Even when taking into account the added cost of a tunable transceiver/OEO module, a significant cost savings is obtained when constructing networks with as few as four 10 GE DWDM channels. In the case of OC-48 OEOs, the savings is smaller due to the lower cost associated with OEO modules.

Note that alternatively for an ADM with a single network interface, a card comprising a 1×2 coupler and a 1×2 switch may be inserted at the output of the ADM to obtain the functionality of the scheme in FIG. 4.

Dual Hub Optical Ring Network Limitation

The 1:N optical protection scheme of FIGS. 3 and 4 can be applied to optical ring networks with the following limitations:

1. The connection between the hub and each of the access nodes (i.e. OADMs within the nodes) is limited to point to point connections only. In other words, a dedicated wavelength must be provisioned for each access node. Normally, wavelengths cannot be shared without the use of two transceivers in the hub.
2. A dual hub topology may not employ the protection scheme of FIGS. 3 and 4. The use of the protection scheme is dependent on the location of the two hubs (same or different sites) and on the required connectivity between them.

Figure 5:
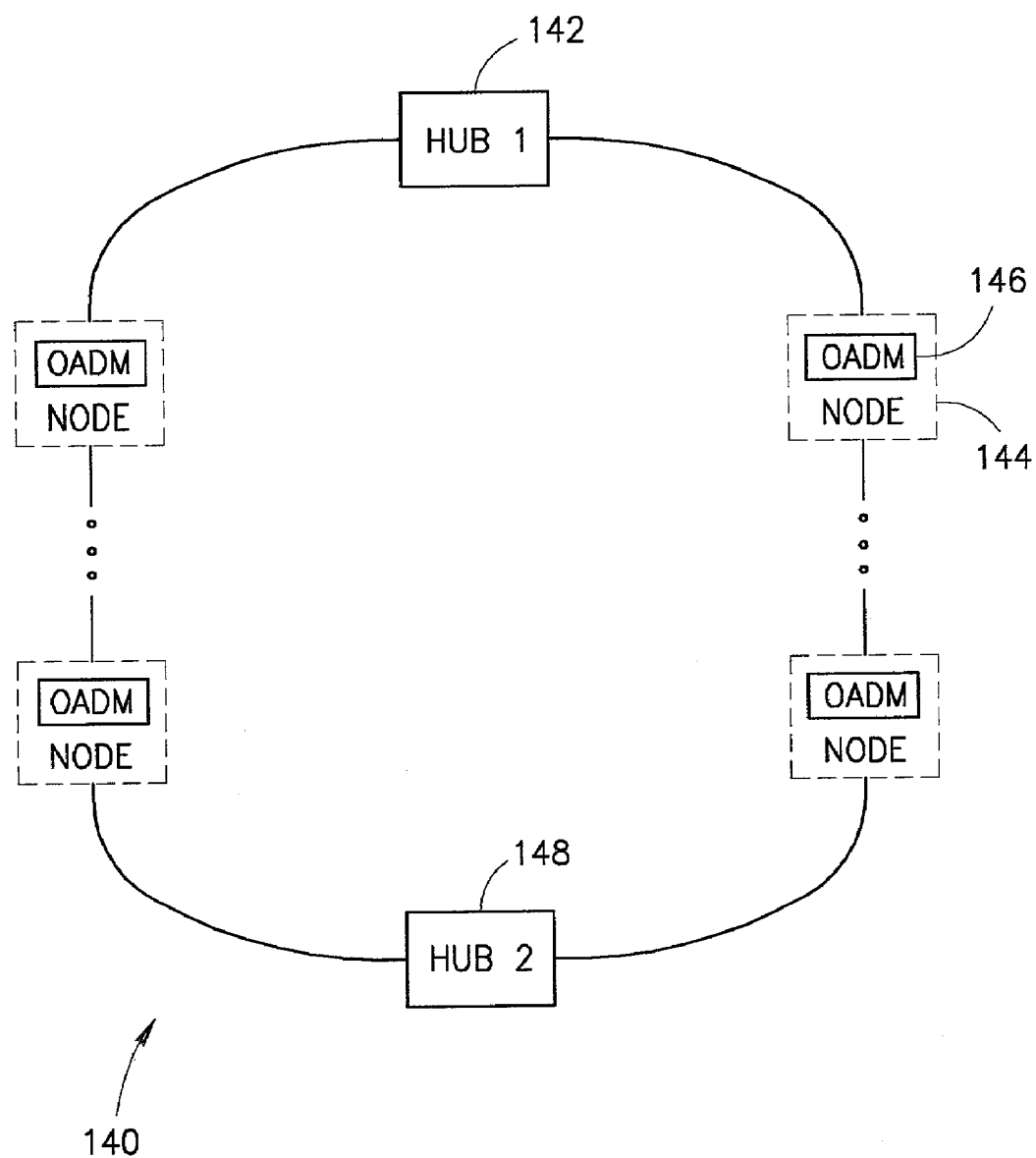
FIG. 5 is a network diagram illustrating an example dual hub optical ring network wherein each hub provides 1:N protection against line and equipment failures in accordance with the present invention.

To illustrate the above limitations, an example of a dual hub network is presented. A network diagram illustrating an example dual hub optical ring network wherein each hub provides 1:N protection against line and equipment failures in accordance with the present invention is shown in FIG. 5. The network, generally referenced 140, comprises two hubs 142, 148 and a plurality of access nodes 144 each incorporating an OADM 146.

Since the protection scheme of the present invention eliminates the use of double equipment in the hub, it does not support wavelength sharing on the ring. This is because different data signals having the same wavelength cannot arrive at the hub from opposite directions.

In order to overcome this limitation, the present invention provides a mechanism for providing the 1:N optical protection scheme in a dual hub ring network. In accordance with the invention, one or more switches are added to each hub that switch the signal received over the link either to the internal hub circuitry or through to the port connected to the opposite link.

Dual Hub with 1:N Optical Protection Using Tunable Transceiver

Figure 6:
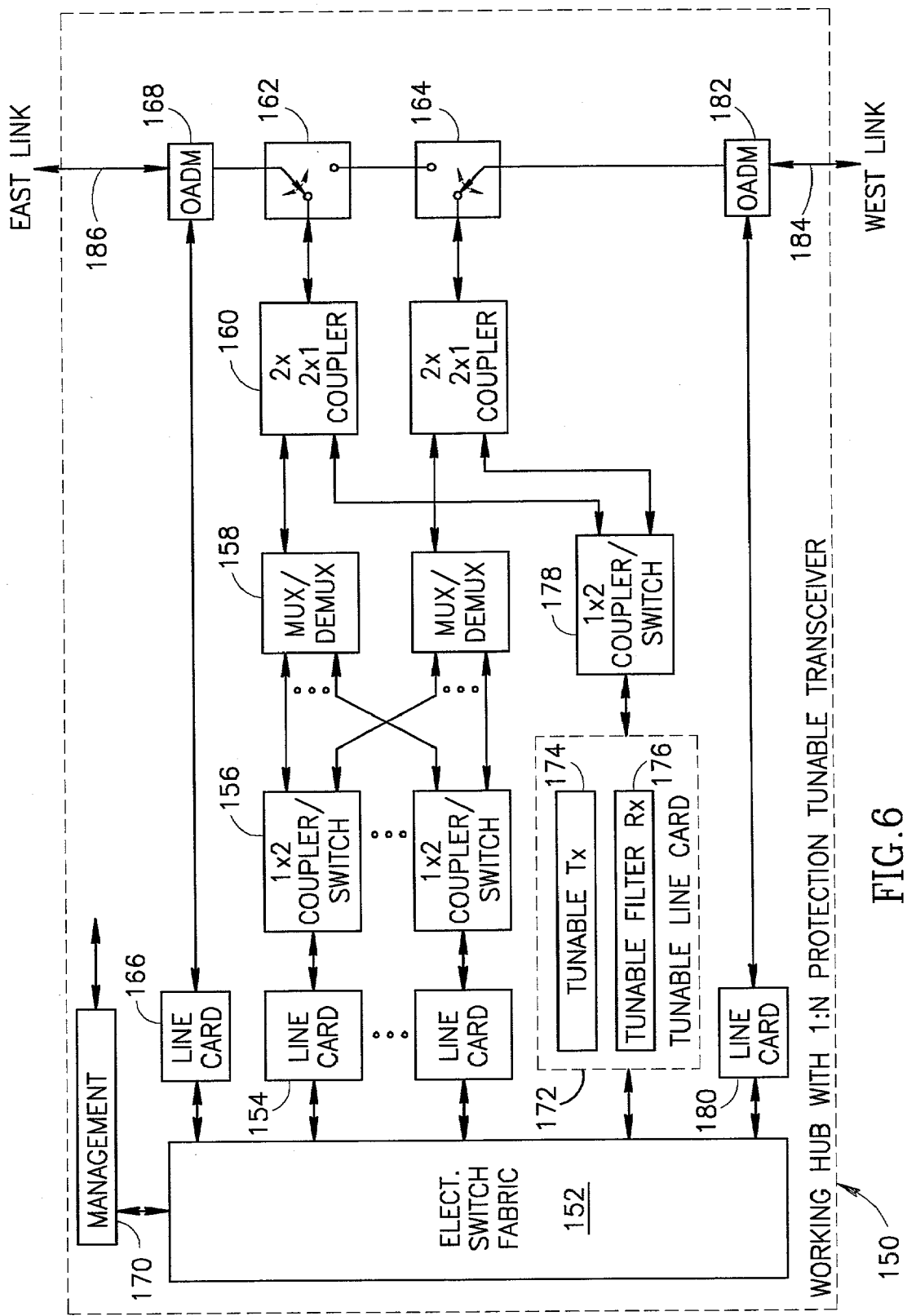
FIG. 6 is a block diagram of a network hub incorporating 1:N protection against both line and equipment failures employing tunable transceivers and adapted to operate in a dual hub optical ring network in accordance with the present invention.

A block diagram of a network hub incorporating 1:N protection against both line and equipment failures employing tunable transceivers and adapted to operate in a dual hub optical ring network in accordance with the present invention is shown in FIG. 6. The hub, generally referenced 150, is adapted to be connected in a dual hub based optical ring network to communication links traveling in opposite directions, herein labeled East link 186 and West link 184.

In accordance with the invention, the hub provides a 1:N optical protection scheme for a logical star over physical ring network topology. The access nodes remain unchanged while the hub is modified to provide protection against both line and equipment failures. In addition, the hub 150 comprises means for avoiding the single point of failure problem that would arise otherwise.

In particular, the hub comprises a switch 152 coupled to N line cards 154 (assuming N number of DWDM channels), N 1×2 coupler/switch modules 156, dual multiplexer/demultiplexers 158, 2×(2×1) couplers 160, a tunable line card 172 and associated 1×2 coupler/switch 178. In addition, a management module 170 provides administration, operation, control and management functions in the hub. It is noted that this portion of the hub is similar in construction and operation to that of FIG. 3.

In addition, a pair of optical switches are added which control whether the receive signal is passed to the receiver or back out to the link in the opposite direction. The switches 162, 164 can be in either a working mode or a bypass (or standby) mode of operation. In FIG. 6, the switches are shown in the working mode of operation. In operation, the ring comprises two such hubs with one being in working mode and the in standby mode. Under normal conditions, the hubs cannot be in the same operation mode at the same time, i.e. one node is always in a working mode and the other in standby.

In the working mode, the hub operates as described in connection with the hub 70 shown in FIG. 3, providing 1:N protection scheme as described supra. When in standby mode, the optical switches couple the East and West links together and the hub becomes transparent to the devices on the network.

For operation, control, administration and management purposes, a means of communications between the two hubs and possible other entities is provided. In particular, the OADMs 168, 182 and line cards 166, 180 coupled respectively thereto, provide in band or out of band control communications channel. Data related to the operating state of each hub is communicated between the hubs. For example, when a failure in a working hub is detected, the standby hub is notified and a switchover is affected whereby the optical switches 162, 164 in the standby hub are switched to place the hub in a working operation mode.

Dual Hub with 1:N Optical Protection Using Tunable OEO Modules

Figure 7:
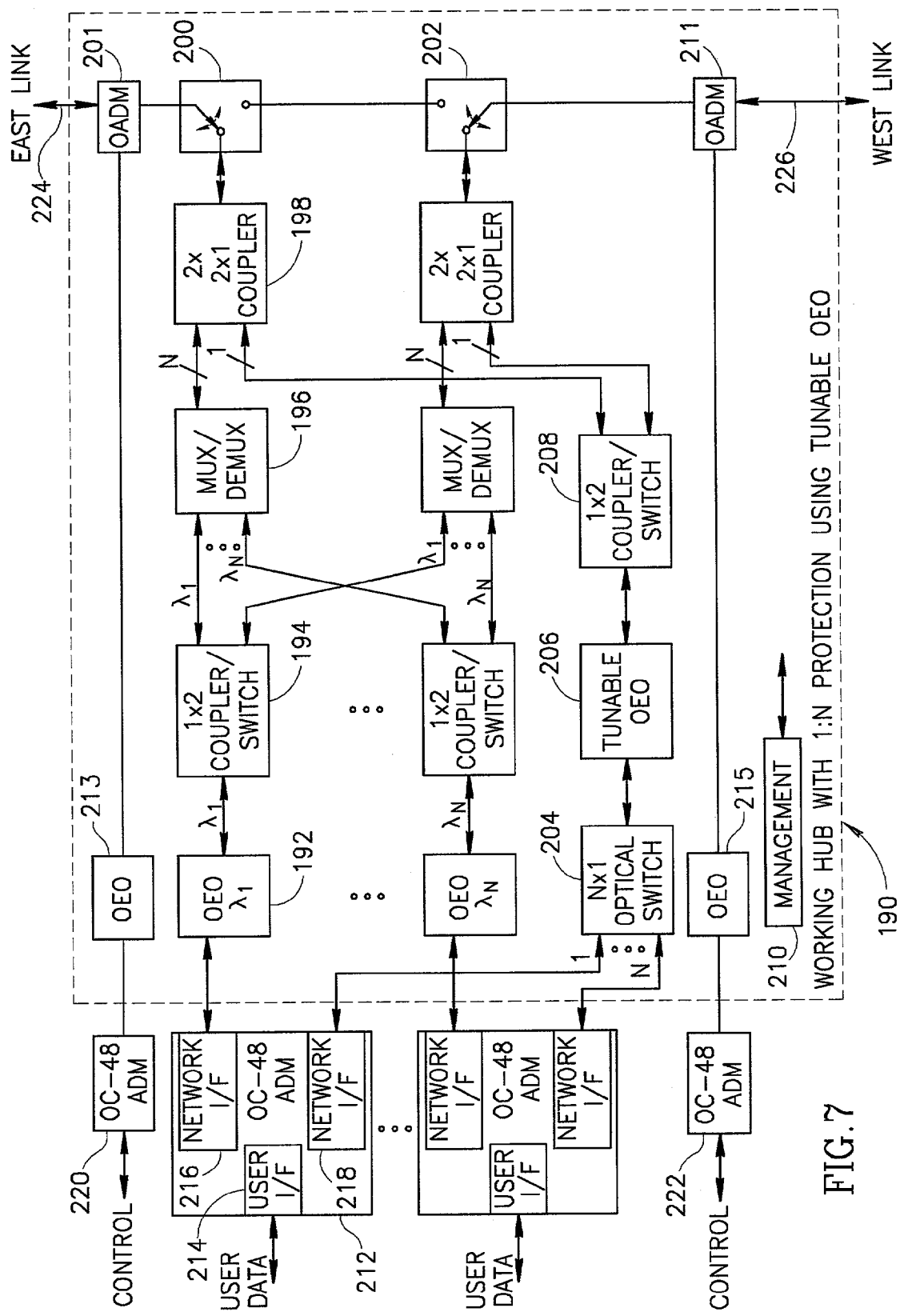
FIG. 7 is a block diagram of a network hub incorporating 1:N protection against both line and equipment failures employing tunable OEO modules and adapted to operate in a dual hub optical ring network in accordance with the present invention.

A block diagram of a network hub incorporating 1:N protection against both line and equipment failures employing tunable OEO modules and adapted to operate in a dual hub optical ring network in accordance with the present invention is shown in FIG. 7. This configuration employs external ADMs having any desired data rate, e.g., OC-48, OC-192, etc. Each external ADM supports at least two data streams for protection purposes.

In particular, the hub, generally referenced 190, comprises N OEO modules 192 (assuming N number of DWDM channels), N 1×2 coupler/switch modules 194, dual multiplexer/demultiplexers 196, 2×(2×1) couplers 198, an N×1 optical switch 204, tunable OEO module 206 and associated 1×2 coupler/switch 208. In addition, a management module 210 provides administration, operation, control and management functions in the hub. It is noted that this portion of the hub is similar in construction and operation to that of FIG. 4.

The operation of the hub 190 is similar to that of the hub 110 of FIG. 4 with the difference being the addition of optical switches 200, 202, internal OADMs 201, 211 and OEO modules 213, 215. Each OEO module is configured to convert the signal received from the external ADM to a different fixed wavelength. The multiplexed signals are coupled with the signal from the tunable OEO module and the coupled signal sent in opposite directions over the ring, e.g., East link 224 and West link 226.

The external ADMs 212 comprise a user interface 214 and at least two network interfaces 216, 218. The user interface is connected to a source of user data. One network interface of each ADM is connected to one of N OEO modules. The second network interface of each ADM is connected to an N×1 optical switch which is configured to couple one of the N inputs to the tunable OEO module in the event of a failure. The output of the tunable OEO module is subsequently split for transmission over both directions of the ring.

The pair of optical switches 200, 202 control whether the signals received over the links are bypassed between each other or are passed to the hub circuitry. Similar to that of the hub 150 in FIG. 6, the switches 200, 202 can be either in a working mode or a bypass (or standby) mode of operation. In FIG. 7, the switches are shown in the working mode of operation. In operation, the ring comprises two such hubs with one being in working mode and the other in standby mode. Under normal conditions, the hubs cannot be in the same operation mode at the same time, i.e. one node is always in a working mode and the other in standby.

In working mode, the hub operates to provide 1:N protection as described supra. When in standby mode, the switches couple the East and West links together and the hub becomes transparent to the devices on the network.

For operation, control, administration and management purposes, a means of communications between the two hubs and possible other entities is provided. In particular, the internal OADMs 201, 211 are coupled to OEO modules 213, 215, respectively, and provide an in band and/or out of band control communications channel. Data related to the operating state of each hub is communicated between the hubs. For example, a failure in a working hub is detected, the standby hub is notified and a switchover is affected whereby the switches 200, 202 in the standby hub are thrown to place the hub in a working operation mode.

It is noted that the present invention is not limited to the embodiments illustrated above. For example, the closed system of FIG. 3 and the open system of FIG. 4 may be combined to construct a hybrid system comprising portions of both systems. Such a hybrid system comprises one or more transceivers operative in combination with OEOs and external ADMs or the equivalent thereof. Similarly, the systems of FIGS. 6 and 7 may be combined whereby several transceivers (or line cards, etc.) are combined with several OEO modules in the same device.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A network hub for providing 1:N protection connected over a Dense Wave Division Multiplexing (DWDM) optical ring network to a plurality of access nodes, comprising:

N transceivers, each transceiver adapted to transmit and receive over a different wavelength, wherein N is a positive integer;

a tunable transceiver adapted to transmit and receive over a plurality of wavelengths, wherein in the event of a failure of one of said N transceivers, said tunable transceiver configured to transmit and receive using the wavelength of said failed transceiver;

a mux/demux adapted to multiplex N transmit signals output of said N transceivers to yield a multiplexed transmit signal, and to demultiplex a multiplexed receive signal into N receive signals input to said N transceivers;

means for optically coupling said multiplexed transmit signal with the output of said tunable transceiver to yield a combined transmit signal;

a first optical splitter adapted to split said combined transmit signal into an east transmit signal and a west transmit signal and simultaneously transmit said east transmit signal and said west transmit signal in opposite directions over said optical ring;

an optical switch adapted to select, in accordance with a predetermined criteria, one of an east receive signal or a west receive signal received from opposite directions of said ring and to output a multiplexed receive signal therefrom; and a second optical splitter adapted to split said multiplexed receive signal for input to said tunable transceiver and said mux/demux.

2. The network hub according to claim 1, wherein said optical switch is adapted to select the receive signal yielding a lower Bit Error Rate (BER).

3. The network hub according to claim 1, wherein said optical switch is adapted to select the receive signal having a higher power.

4. The network hub according to claim 1, wherein a loss of signal (LOS) condition in one direction of said ring causes said optical switch to select the signal received over the opposite direction of said ring.

5. The network hub according to claim 1, wherein said tunable transceiver comprises a transmitter incorporating a tunable laser and a receiver incorporating a tunable filter.

6. The network hub according to claim 1, further comprising an electrical switch fabric adapted to switch the electrical output of said N transceivers and said tunable transceiver.

7. The network hub according to claim 1, wherein said tunable transceiver is adapted to remain in a standby mode of operation until a failure of one of said N transceivers.

8. The network hub according to claim 1, wherein said means for optically coupling comprises an optical coupler.

9. A network hub for providing 1:N protection connected over a Dense Wave Division Multiplexing (DWDM) optical ring network to a plurality of access nodes, comprising:

N transceivers, each transceiver adapted to transmit and receive over a different wavelength, wherein N is a positive integer;

a first multiplexer and a second multiplexer adapted to multiplex said N signals into a single multiplexed signal;

N first couplers, each first coupler adapted to couple the signal output of one of said N transceivers to an input of said first multiplexer and said second multiplexer;

a tunable transceiver adapted to transmit and receive over a plurality of wavelengths, wherein in the event of a failure of one of said N transceivers, said tunable transceiver configured to transmit and receive using the wavelength of said failed transceiver;

a first coupler adapted to combine the output of said first multiplexer and said tunable transceiver and to transmit a first combined signal generated therefrom in a first direction over said optical ring;

a second coupler adapted to combine the output of said second multiplexer and said tunable transceiver and to transmit a second combined signal generated therefrom in a second direction opposite to that of said first direction over said optical ring;

a third coupler adapted to couple a signal received from said first direction of said optical ring to a first demultiplexer and to a first optical switch;

a fourth coupler adapted to couple a signal received from said second direction of said optical ring to a second demultiplexer and to said first optical switch;

said first demultiplexer and said second demultiplexer adapted to demultiplex an input signal into N signals each having a different wavelength;

said first optical switch adapted to select one of two signals received from opposite directions of said optical ring in accordance with a predetermined criteria and to output the selected signal to said tunable transceiver; and N second optical switches adapted to receive said N signals output of each of said first demultiplexers and said second demultiplexers, each second switch adapted to select one of two signals received from said opposite directions of said optical ring in accordance with a predetermined criteria and to output the selected signal to one or N transceivers associated therewith.

10. The network hub according to claim 9, wherein said first optical switch and said N second optical switches are adapted to select a signal input thereto that yields a lower Bit Error Rate (BER).

11. The network hub according to claim 9, wherein said first optical switch and said N second optical switches are adapted to select the input signal having a higher power.

12. The network hub according to claim 9, wherein a loss of signal (LOS) condition in one direction of said ring causes said first optical switch and said N second optical switches to select the signal received over the opposite direction of said ring.

13. The network hub according to claim 9, wherein said tunable transceiver comprises a transmitter incorporating a tunable laser and a receiver incorporating a tunable filter.

14. The network hub according to claim 9, wherein said tunable transceiver is adapted to remain in a standby mode of operation until a failure of one of said N transceivers.

15. The network hub according to claim 9, further comprising an electronic switch fabric adapted to switch data traffic received from said tunable transceiver and said N transceivers.

16. A network hub for providing 1:N protection connected over a Dense Wave Division Multiplexing (DWDM) optical ring network to a plurality of access nodes, comprising:

N OEO modules, each transceiver adapted to transmit and receive over a different wavelength, wherein N is a positive integer and wherein each OEO module is in communication with a first network interface port of an ADM device;

means for splitting the output of each OEO module into an east transmit signal and a west transmit signal;

a tunable OEO module adapted to transmit and receive over a plurality of wavelengths, wherein in the event of a failure of one of said N transceivers, said tunable transceiver configured to transmit and receive using the wavelength of said failed transceiver;

an N×1 optical switch adapted to transmit and receive and to be connected to said tunable OEO module and second network interface ports on N ADM devices;

an east mux/demux adapted to multiplex and demultiplex N east transmit signals output of said N OEO modules to and from an east multiplexed signal;

a west mux/demux adapted to multiplex and demultiplex N west transmit signals output of said N OEO modules to and from a west multiplexed signal;

means for combining said east multiplexed signal and the output of said tunable OEO module to yield an east output signal and for combining said west multiplexed signal and the output of said tunable OEO module to yield a west output signal;

transmitting said east output signal and said west output signal in opposite directions over said optical ring;

first means for optically switching either N east receive signals output from said east mux/demux or N west receive signals output from said west mux/demux to said N OEO modules, respectively, in accordance with a predetermined criteria; and second means for optically switching either an east input signal or a west input signal to said tunable OEO module, in accordance with said predetermined criteria.

17. The network hub according to claim 16, wherein said first means for optically switching and said second means for optically switching are adapted to select a signal input thereto that yields a lower Bit Error Rate (BER).

18. The network hub according to claim 16, wherein said first means for optically switching and said second means for optically switching are adapted to select the input signal having a higher power.

19. The network hub according to claim 16, wherein a loss of signal (LOS) condition in one direction of said ring causes said first means for optically switching and said second means for optically switching to select the signal received over the opposite direction of said ring.

20. The network hub according to claim 16, wherein said tunable OEO module comprises a transmitter incorporating a tunable laser and a receiver incorporating a tunable filter.

21. The network hub according to claim 16, wherein said tunable OEO module is adapted to remain in a standby mode of operation until a failure of one of said N OEO modules.

22. A method of providing 1:N protection in a network hub connected to a dual hub based Dense Wave Division Multiplexing (DWDM) optical ring incorporating a plurality of access nodes, said method comprising the steps of:

providing N transceivers, each transceiver adapted to transmit and receive over a different wavelength, wherein N is a positive integer;

providing a tunable transceiver adapted to transmit and receive over a plurality of wavelengths, wherein in the event of a failure of one of said N transceivers, said tunable transceiver configured to transmit and receive using the wavelength of said failed transceiver;

splitting the signal output of each transceiver to generate N first output signals and N second output signals;

multiplexing said N first output signals to generate a first multiplexed signal and said N second output signals to generate a second multiplexed signal;

coupling the output of said tunable transceiver to generate a first tunable output signal and a second tunable output signal;

combining the output of said first multiplexed signal and said first tunable output signal to generate a first combined signal therefrom, and the output of said second multiplexed signal and said second tunable output signal to generate a second combined signal therefrom;

switching a first communication link and a second communication link, connected in opposite directions of said ring, either to said first combined signal and said second combined signal, respectively, or to each other depending on whether said network hub is in a working mode of operation or a standby mode of operation;

selecting either a signal received from said first communication link or said second communication link for input to said tunable transceiver in accordance with a criteria;

demultiplexing a signal received over said first communication link to generate N first demultiplexed signals and a signal received over said second communication link to generate N second demultiplexed signals; and selecting either said N first demultiplexed signal or said N second demultiplexed signal for input to said N transceivers in accordance with a criteria.

23. The method according to claim 22, wherein said criteria comprises selecting the signal yielding a lower Bit Error Rate (BER).

24. The method according to claim 22, wherein said criteria comprises selecting the signal having a higher power.

25. The method according to claim 22, wherein in the event of a loss of signal (LOS) condition in one direction of said ring, said criteria comprises selecting the surviving signal received from the opposite direction of said ring.

26. A network hub for providing 1:N protection connected in a dual hub based Dense Wave Division Multiplexing (DWDM) optical ring network incorporating a plurality of access nodes, comprising:

N OEO modules, each transceiver adapted to transmit and receive over a different wavelength, wherein N is a positive integer and wherein each OEO module is in communication with a first network interface port of an add/drop multiplexer (ADM) device;

a tunable OEO module adapted to transmit and receive over a plurality of wavelengths, wherein in the event of a failure of one of said N transceivers, said tunable transceiver configured to transmit and receive using the wavelength of said failed transceiver;

an N×1 optical switch adapted to transmit and receive and to be connected to said tunable OEO module and second network interface ports on N ADM devices;

a first coupler/switch for coupling, in a transmit direction, the signal output of each of N OEO modules to generate N first output signals and N second output signals, and for selecting, in a receive direction, either a first demultiplexed signal or a second demultiplexed signal in accordance with a criteria;

a second coupler/switch for coupling, in a transmit direction, the signal output of said tunable OEO module to generate a first tunable output signal and a second tunable output signal, and for selecting, in a receive direction, either a signal received over a first communication link or a second communication link in accordance with a criteria, said second communication link connected in a direction over said ring opposite to that of said first communication link;

a first mux/demux and a second mux/demux, said first mux/demux for multiplexing, in the transmit direction, said N first output signals to generate a first multiplexed signal therefrom, and in the receive direction, for demultiplexing a first received signal to generate N first demultiplexed signals therefrom, said second mux/demux for multiplexing, in the transmit direction, said N second output signals to generate a second multiplexed signal therefrom, and in the receive direction, for demultiplexing a second received signal to generate N second demultiplexed signals therefrom;

a first coupler and a second coupler, in the transmit direction, said first coupler for combining said first multiplexed signal and said first tunable output signal to generate a first coupled signal thereby and said second coupler for combining said second multiplexed signal and said second tunable output signal to generate a second first coupled signal thereby, and in the receive direction, said first coupler for coupling a first received signal to said first mux/demux and to said second splitter/switch, and said second coupler for coupling a second received signal to said second mux/demux and to said second splitter/switch; and a first switch and a second switch adapted to couple said first communication link and said second communication link, connected in opposite directions of said ring, either to said first coupler and said second coupler, respectively, or to each other depending on whether said network hub is in a working mode of operation or a standby mode of operation.

27. The network hub according to claims 26, wherein said criteria comprises selecting the signal yielding a lower Bit Error Rate (BER).

28. The network hub according to claims 26, wherein said criteria comprises selecting the signal having a higher power.

29. The network hub according to claims 26, wherein in the event of a loss of signal (LOS) condition in one direction of said ring, said criteria comprises selecting the surviving signal received from the opposite direction of said ring.

30. A network hub incorporating protection against equipment and line failures in a Wave Division Multiplexing (WDM) optical ring network, comprising;

a plurality of transceivers;

a tunable transceiver adapted to transmit and receive over a plurality of wavelengths, wherein said tunable transceiver transmits and receives in the event of a failure of one of said plurality of transceivers;

means for combining the output of said plurality of transceivers and said tunable transceiver to yield a transmit signal therefrom and for splitting and transmitting said transmit signal in opposite directions over said optical ring; and an optical switch for receiving an east received signal and a west received signal from opposite directions of said optical ring, and for switching one of said east received signal and said west received signal for input to said plurality of transceivers and to said tunable transceiver in accordance with a predetermined criteria.

* * * * *